UNITED STATES PATENT OFFICE.

FLETCHER B. HOLMES, OF WOODBURY, NEW JERSEY, ASSIGNOR TO THE E. I. DU PONT DE NEMOURS POWDER COMPANY, OF WILMINGTON, DELAWARE, A CORPORATION OF NEW JERSEY.

STABLE EXPLOSIVE.

No. 895,639.     Specification of Letters Patent.     Patented Aug. 11, 1908.

Application filed May 20, 1907. Serial No. 374,538.

*To all whom it may concern:*

Be it known that I, FLETCHER B. HOLMES, a citizen of the United States, residing at Woodbury, county of Gloucester, and State of New Jersey, have invented a new and useful Improvement in Stable Explosives, of which the following is a full, clear, and exact description.

The object of my invention is to produce stable nitrated starch.

Nitrated starch may be used as an explosive itself, or preferably may be used as a component part of an explosive, such as where it is mixed with sodium nitrate, potassium nitrate, or some other oxygen carrier, with or without the addition of other ingredients.

The difficulty with nitrated starch is that it is very unstable, being liable to decomposition. When such nitrated starch decomposes, which it is liable to do at ordinary temperatures, it becomes liable to spontaneous combustion.

I have discovered that I can produce a stable nitrated starch by mixing with nitrated starch ammonium carbonate.

As is well known, the various carbonates of ammonia pass rather readily from one to the other and commercial ammonium carbonate is usually a mixture of several compounds. Thus commercial ammonium carbonate may consist of one or a mixture of two or more of the following compounds: Normal ammonium carbonate $(NH_4)_2CO_3H_2O$, the acid carbonate $(NH_4)HCO_3$, the sesqui carbonate $(NH_4)_2CO_3 2NH_4HCO_3H_2O$ and the carbonate of ammonia $NH_4O(CONH_2)$.

Any one of or a mixture of, two or more of these compounds are included in the term ammonium carbonate as used by me and are effective for my purpose.

In practice the ammonium carbonate is mixed with the nitrated starch prepared in the ordinary and well known manner and in an amount preferably from two to five per cent., although I have used larger and smaller amounts with success.

Having now fully described my invention, what I claim and desire to protect by Letters Patent is:

1. A stable nitrated starch consisting of a mixture of nitrated starch and ammonium carbonate, the latter being in such proportion as to stabilize the nitrated starch.

2. A stable nitrated starch consisting of a mixture of nitrated starch and from two to five percent. of ammonium carbonate.

In testimony of which invention, I have hereunto set my hand, at Philadelphia, on this 15th day of May, 1907.

FLETCHER B. HOLMES.

Witnesses:
    M. M. HAMILTON,
    E. E. WALL.